April 13, 1965     A. MULLER     3,178,552
ELECTRIC ARC WELDING

Filed June 20, 1956     2 Sheets-Sheet 1

INVENTOR.
ALBERT MULLER
BY
ATTORNEY & AGENT

April 13, 1965   A. MULLER   3,178,552
ELECTRIC ARC WELDING
Filed June 20, 1956   2 Sheets-Sheet 2

INVENTOR.
ALBERT MULLER
BY H. Hume Matthews
Edmund W Bopp
ATTORNEY & AGENT

United States Patent Office 3,178,552
Patented Apr. 13, 1965

3,178,552
ELECTRIC ARC WELDING
Albert Muller, Watchung, N.J., assignor to Air Reduction Company, Incorporated, New York, N.Y., a corporation of New York
Filed June 20, 1956, Ser. No. 592,577
2 Claims. (Cl. 219—74)

This invention relates to electric arc welding and more particularly to electric arc welding of the type in which a welding arc is maintained between a continuously fed consumable wire electrode and the work.

One of the most popular and successful arc welding methods presently in use is the "coated" or "stick" electrode welding method. In this form of welding a coating is formed on a wire electrode by extrusion or dipping. The coating is so formulated as to provide one or more of the functions of providing a fluxing action, providing a shielding atmosphere, modifying the arc characteristics, and providing filler metal and alloying ingredients to the weld. While this welding technique is eminently successful it has certain inherent limitations. It is, for example, a distinct disadvantage to be limited to short stick length electrodes. Such lengths result in a low welding duty cycle, stub end losses and varying welding conditions as the electrode length (and hence the electrode resistance) diminishes. Accordingly it has been sought for a great many years to provide a continuous arc welding method employing a wire electrode of indefinite length and a flux in a manner to match or exceed the results of "stick" electrode welding while overcoming the disadvantages imposed by that method.

One such attempt is the so called "magnetic flux" welding method, disclosed in detail in British patent specification 608,270 and in a paper entitled "Improved Semi-automatic Welding and Hard Facing," by Howard S. Avery et al., published on pages 1093 et seq. of the November 1954 issue of the Welding Journal. In this method a bare welding electrode of indefinite length is employed with a granular flux containing a substantial concentration of magnetic (paramagnetic) material fed by gravity from a hopper to the wire in the vicinity of the arc. As welding current flows in the wire a magnetic field is established around the wire and as the magnetic flux comes within the influence of this field it adheres magnetically to the wire to form a coating thereon.

Since the magnetic flux method described above depends on gravity to feed the flux to the electrode the device has definite limitations on where and how it can be used and at what rate flux can be fed to the wire. For instance the flux hopper must always be directly above the electrode. This limits the size of the hopper that can be used on manual equipment and prevents the use of the equipment in more than one position.

It is an object, therefore, of the present invention to provide an improved arc welding method and apparatus which utilizes a bare electrode of indefinite length and a flux having magnetic properties, and is capable of operation in all positions.

Another object is to provide a method and apparatus for arc welding with a bare wire and a magnetic flux in which the flux is fed from a hopper remote from the welding head or gun.

Another object is to provide a method and apparatus for arc welding with a bare wire and a magnetic flux in which the magnetic powder feed rate is independent of the electrode wire feed rate, and the welding current strength.

These and other objects and advantages of the invention will be pointed out or will become apparent from the following detailed description and the accompanying drawings.

According to the present invention a flux having magnetic properties is fed by a conveying gas stream from a remote hopper to the electrode wire in the region between the point at which the welding current is introduced into the wire and the arc end of the wire. Muller Patent 2,727,125, issued December 13, 1955, and assigned to the assignee of the present application, discloses conveying a powdered material to the welding arc in a flowing gas stream. In the instant invention as the powder containing gas passes in the close vicinity of the current conducting electrode the magnetic powder is separated from the gas stream and attracted to the surface of the electrode to form a magnetically supported coating thereon. The carrier gas preferably is of a nature to make it useful as an arc shielding gas and is discharged around the arc for that purpose. However if the powdered material carried to the arc is of a type that provides its own arc generated shielding atmosphere the carrier gas may be an active gas such as air and still perform satisfactorily.

Figure 1:
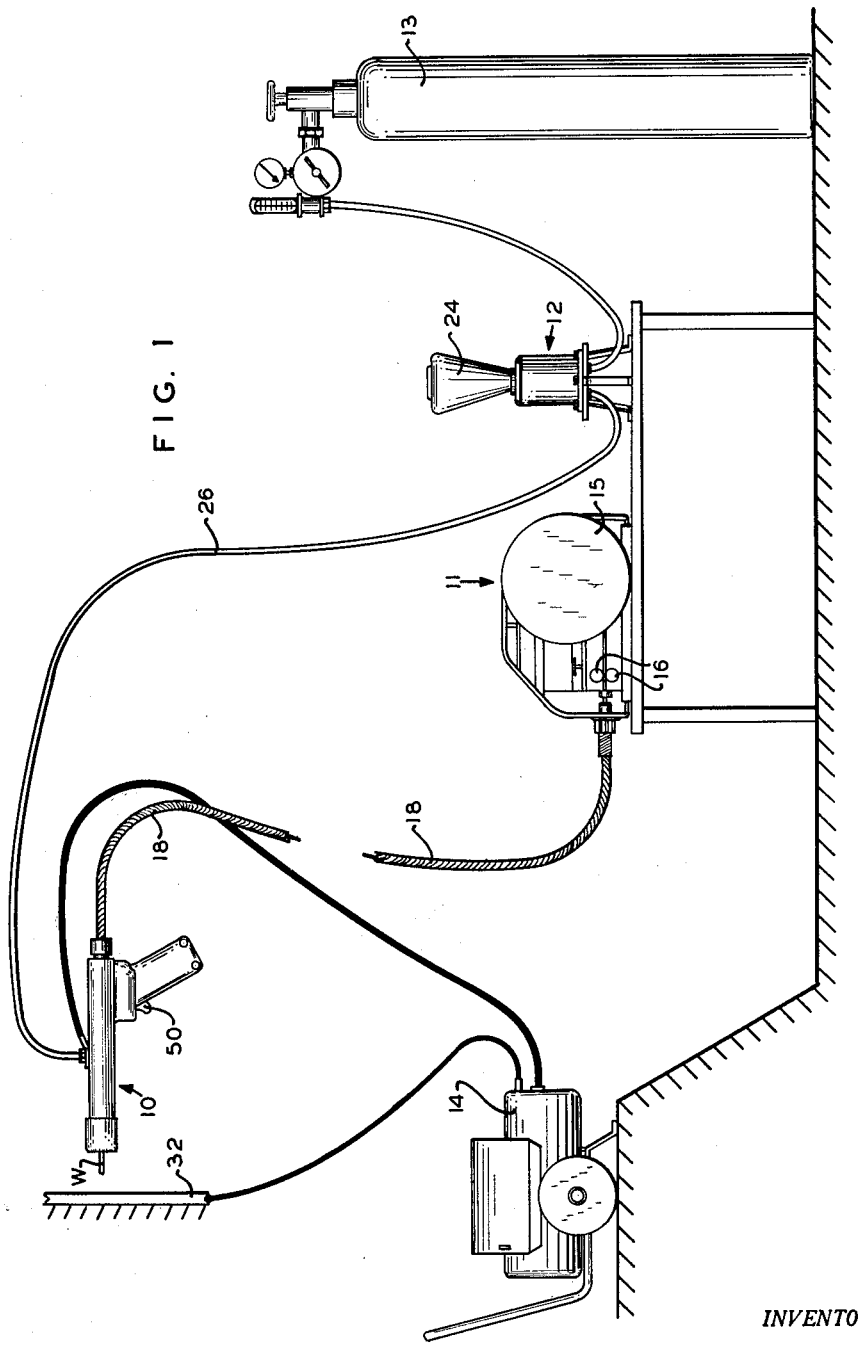
FIG. 1 illustrates suitable apparatus for carrying out the present invention.
Figure 2:
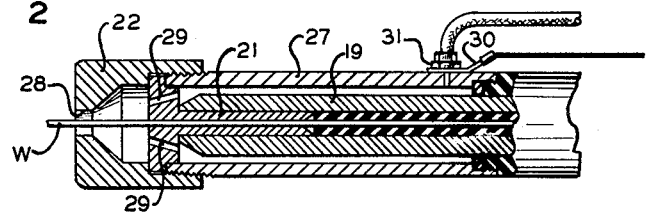
FIG. 2 is a view partially in section and on an enlarged scale of the welding gun of FIG. 1.

Essentially the apparatus consists of a welding gun 10, a wire feeding carriage 11, a powder dispensing unit 12, a source of gas under pressure 13, and a source of welding current 14. Electrode wire W is fed from a reel 15 on the carriage 11 by a pair of feed rolls 16 which are driven by an electric motor (not shown). As the wire is withdrawn from reel 15 it is pushed through a flexible casing 18 to the welding gun 10 where it passes through an inner barrel 19 (FIG. 2) to a contact tube 21 at the forward end of the inner barrel and thence through a nozzle cap 22 to the arc. Magnetic flux in dry granular form is fed from the hopper 24 of the powder dispenser 12 (FIGS. 3 and 4) at a uniform controlled rate into a flowing gas stream from the source 13 of compressed gas, which stream carries the dispensed flux through conduit 26 to the welding gun 10. The powder suspended in the gas passes through a passage in the gun between the inner barrel 19 and an outer barrel 27 from which passage it is discharged through a plurality of holes 29 in the flanged forward face of contact element 21 into the nozzle cap 22. From the nozzle cap 22 it is discharged through orifice 28 around the electrode wire W. In the particular form of welding gun illustrated, the welding current supplied by the welding machine 14 enters the gun through an appropriate lug 30 attached to the gun by the fitting 31 through which the gas and powder is admitted to the gun. The current is conducted by the outer barrel 27 which is preferably made of copper or other highly conductive material to the contact element 21 at the point where the flange of the contact element is clamped between the outer barrel 27 and the nozzle cap 22. The welding current then passes through the flanged portion of the contact element to the tubular body portion from which it enters the welding wire. The welding circuit is completed through a conductor connecting the welding machine 14 with the workpiece 32.

Figure 3:
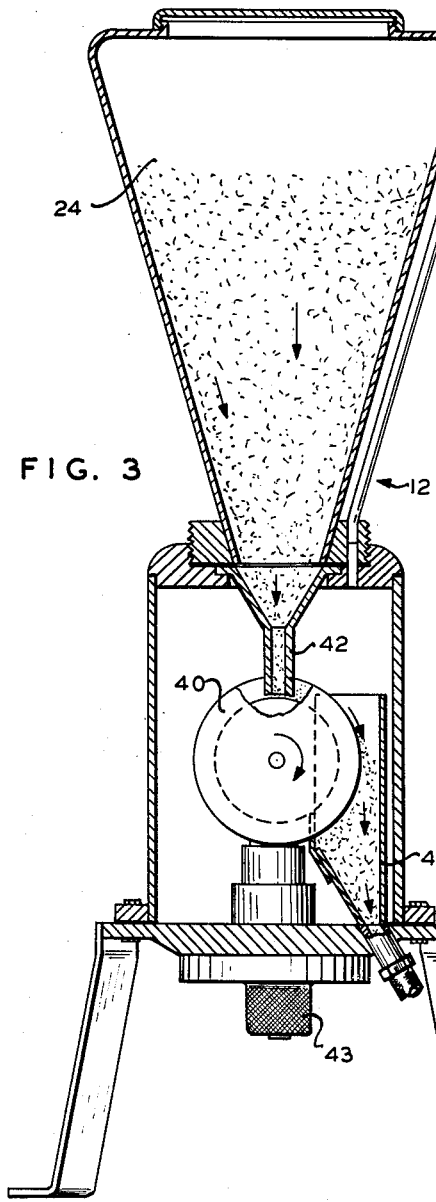
FIG. 3 is a sectional view on an enlarged scale of the powder dispensing device of FIG. 1.
Figure 4:
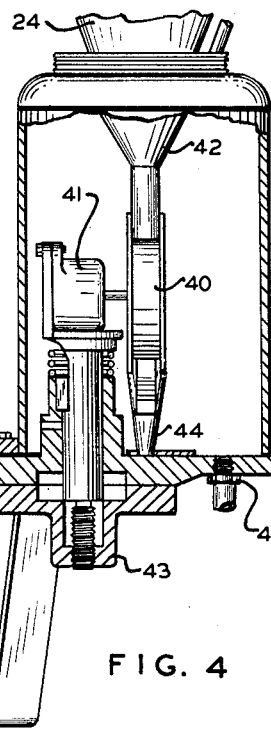
FIG. 4 is a sectional view on an enlarged scale of the powder device of FIG. 1 taken in a plane transverse to that of FIG. 3.

The construction of a suitable powder dispensing unit is more clearly shown in FIGS. 3 and 4. A rotating drum 40 is driven by an electric motor 41. The drum is located a small distance from the discharge end of funnel 42 which is in direct communication with the hopper 24. The drum 40 and motor 41 are mounted in such a manner that they can be moved up and down with respect to the discharge end of funnel 42 by manipulation of the adjusting screw 43. Powder feeds by gravity from the hopper through the funnel and falls on the drum 40. As the drum rotates, the powder is carried away from the end of the funnel and falls off the side of the drum into a discharge chute 44. Gas enters the powder dispenser through fitting 46 and is discharged from the dispenser through the same discharge chute 44 as the powder, the powder thereby becoming entrained in the flowing gas stream. With this particular type of powder feeder, the powder feed rate may be adjusted by raising or lowering the drum 40 with respect to the end of the funnel 42 or by varying the speed of rotation of the drum 40. It may be seen that the powder feed rate is completely independent of the gas flow. There are many other types of powder feeders well known in the art such as that shown in Anderson Patent No. 2,738,234, which are also suitable for use in the present invention. It is intended in this specification to include fluidization within the definition of suitable methods for conveying the powder to the welding gun.

A trigger switch 50 on the welding gun 10 may be used to control the wire feed motor, the powder dispenser motor, and if desired a welding contactor. It may be seen from the above brief description of the apparatus that powder can be picked up in a gas stream to feed to the welding gun from which it is discharged through the nozzle cap around the electrode wire. By using a powder which is magnetic in nature it will adhere to the electrode wire when welding current is flowing in the electrode wire. By this process the powder is separated from the conveying gas and forms a coating on the electrode. The conveying gas is discharged through the orifice 28 in the nozzle cap around the magnetically coated electrode and acts as a shield for the arc and the weld puddle if the conveying gas is of such a nature as to have a beneficial shielding effect. All of the connections to the gun 10 are flexible so that the gun may be readily manipulated. Because the powder hopper is remotely located with respect to the gun and is stationary, the gun is lighter than if the hopper were mounted on it, and in addition, with this arrangement the gun may be used in all positions. The hopper, being fixed, can be much larger than if mounted on the gun making possible longer continuous runs.

Other forms of welding guns or welding heads, than that illustrated and described may be used although the form shown is preferred because its construction is such as to prevent damming of the magnetic powder in the device as a result of the magnetic fields therein. This particular gun construction is the subject of an application, now Patent Number 2,805,323, of Everett H. Cushman, filed on the same date as the present application. In any apparatus that has universal usefulness with this process some form of magnetic shielding must be used to prevent damming of the powder in the apparatus due to the field produced by the flow of welding current through the apparatus.

It has been found that any dry finely divided powder having an appreciable proportion of a magnetic constituent will operate in accordance with the present invention. It is not necessary that each individual granule be magnetic. In a homogeneous mixture of magnetic and non-magnetic particles the magnetic particles will be attracted to the wire in the manner described and they will mechanically carry the non-magnetic particles with them binding them to the wire as well. A binder such as sodium silicate may be used to consolidate the constituents if desired. In that case, the consolidated mixture is pulverized to prepare it for use in the subject process. It has been found that one part in four of magnetic materials is sufficient to carry out the operation. The magnetic material may be iron, magnetic iron oxide, nickel, or cobalt.

Examples of powders and powder mixtures that have operated satisfactorily are pulverized coating materials of the type used on electrodes of the E6020 and E6024 types (Specifications of American Society for Testing Materials and the American Welding Society) and pulverized cast iron. Said coating materials of E6020 and E6024 electrodes, which are standard, contain appreciable proportions of both magnetic and non-magnetic constituents. The E6020 electrode coating contains a high proportion of magnetic iron oxide and the E6024 electrode coating contains a high proportion of metallic iron powder.

Examples of typical welding conditions with each of the magnetic powders referred to above are shown in Table I.

Table I

|  | Example A | Example B | Example C | Example D |
|---|---|---|---|---|
| Powder Composition | E6024 coating material. | E6024 coating material. | E6020 coating material. | Cast Iron. |
| Powder Feed Rate (lbs. per hr.) | 5.5 | 4 | | |
| Conveying Gas | Air | $CO_2$ | Air | Argon. |
| Electrode Wire | Steel 1/16" dia | Steel 3/32" dia | Steel 1/16" dia | Steel 1/16" dia. |
| Electrode Feed Rate (in. per min.) | 110 | 68 | 215 | |
| Electrode Feed Rate (lb. per hr.) | 5.7 | 7.9 | 11.1 | |
| Welding Current (amp.) | 230 Reverse Polarity. | 275 Reverse Polarity. | 350 Straight Polarity. | 300 Reverse Polarity. |
| Arc Voltage (volts) | 35 | 31 | 34 | 45. |

The physical properties of an all weld metal specimen made from the weld of Example A are as follows:

Yield strength _____ 75,900 pounds per sq. in.
Ultimate tensile strength _____ 83,500 pounds per sq. in.
Percent elongation _____ 17.
Percent reduction in area _____ 42.1.

It has previously been pointed out that the present invention makes it possible to feed magnetic powders to the electrode from a remote hopper for welding in any position.

Inasmuch as iron loses its magnetic properties at some temperature (the Curie point) below the melting temperature it might be surmised that the powder would drop off the electrode before it reached the arc and therefore prevent the use of the process for vertical or overhead welding. It was found, however, that this was not the case and that the powder clung to the wire, and transferred across the arc satisfactorily in every instance.

Moisture frequently is found in the magnetic powder and in the prior art processes this had a tendency to interfere with the production of sound welds in addition to creating powder feeding difficulties. With the present invention any moisture present is picked up by the dry carrier gas. In extreme cases this effect can be exaggerated by heating the carrier gas prior to admitting it to the powder feeder.

It is to be understood that the invention is not limited to the particular forms shown and described but may be used in other ways without departure from its spirit as defined by the following claims.

I claim:
1. A method of electric arc welding which comprises supplying welding current to a consuming wire electrode and workpiece, feeding said electrode toward said workpiece at a rate to maintain an arc therebetween as metal is transferred across said arc from said electrode to said workpiece and introducing into the magnetic field surrounding said electrode as a result of the current passing therethrough a flowing gas stream containing a mixture of finely divided solid particles having magnetic properties and finely divided solid particles that are wholly nonmagnetic whereby substantially all of said solid particles become magnetically bonded to the surface of said electrode.

2. A method of electric arc welding which comprises supplying welding current to a consuming wire electrode and workpiece, feeding said electrode toward said workpiece at a rate to maintain an arc therebetween as metal is transferred across said arc from said electrode to said workpiece and introducing into the magnetic field surrounding said electrode as a result of the current passing therethrough a flowing gas stream containing a mixture of finely divided solid particles having magnetic properties and finely divided solid particles that are wholly-nonmagnetic, the magnetic component of said particles having magnetic properties being present in an amount not less than 25% by weight of the total mixture of solid particles whereby substantially all of said solid particles become magnetically bonded to the surface of said electrode.

References Cited by the Examiner

UNITED STATES PATENTS

| | | | |
|---|---|---|---|
| 1,589,017 | 6/26 | Lincoln | 219—74 |
| 2,727,125 | 12/55 | Muller | 219—74 |
| 2,767,302 | 10/56 | Brashear | 219—130 |
| 2,920,181 | 1/60 | Rockefeller et al. | 219—74 |
| 3,083,290 | 3/63 | Kennedy | 219—130 |

FOREIGN PATENTS

| | | |
|---|---|---|
| 546,961 | 8/42 | Great Britain. |
| 608,270 | 9/48 | Great Britain. |
| 1,146,657 | 5/57 | France. |

RICHARD M. WOOD, *Primary Examiner.*

MAX L. LEVY, LLOYD McCOLLUM, *Examiners.*